(12) United States Patent  (10) Patent No.: US 8,444,085 B2
Stretton et al.  (45) Date of Patent: May 21, 2013

(54) SUPPORT STRUCTURE

(75) Inventors: Richard G. Stretton, Loughborough (GB); Kenneth F. Udall, Ilkeston (GB)

(73) Assignee: Rolls-Royce PLC, London (GB)

( * ) Notice: Subject to any disclaimer, the term of this patent is extended or adjusted under 35 U.S.C. 154(b) by 103 days.

(21) Appl. No.: 13/232,311

(22) Filed: Sep. 14, 2011

(65) Prior Publication Data

US 2012/0091265 A1  Apr. 19, 2012

(30) Foreign Application Priority Data

Oct. 14, 2010 (GB) .................................. 1017303.7

(51) Int. Cl.
*B64D 27/26* (2006.01)

(52) U.S. Cl.
USPC ............................................. 244/54; 248/555

(58) Field of Classification Search
USPC .............. 244/54, 53 R; 248/554–557; 60/797
See application file for complete search history.

(56) References Cited

U.S. PATENT DOCUMENTS

| 2,355,370 | A | * | 8/1944 | Frey .............................. | 248/554 |
| 2,738,647 | A | * | 3/1956 | Hill .................................. | 244/54 |
| 2,931,601 | A | * | 4/1960 | Johnson ......................... | 248/555 |
| 4,854,525 | A | * | 8/1989 | Chee ............................... | 244/54 |
| 5,860,275 | A | * | 1/1999 | Newton et al. .................. | 244/54 |
| 2008/0105782 | A1 | * | 5/2008 | Beardsley ....................... | 244/54 |

FOREIGN PATENT DOCUMENTS

| EP | 1 627 812 A2 | 2/2006 |
| EP | 1 847 457 A2 | 10/2007 |
| GB | 2 275 308 A | 8/1994 |

OTHER PUBLICATIONS

Feb. 9, 2011 Search Report issued in British Patent Application No. GB1017303.7.

* cited by examiner

*Primary Examiner* — Tien Dinh
*Assistant Examiner* — Richard R Green
(74) *Attorney, Agent, or Firm* — Oliff & Berridge, PLC

(57) ABSTRACT

A support structure is provided for attaching a gas turbine engine to a pylon. The gas turbine engine has an engine casing surrounding an engine core, and the pylon has first and second attachment positions, the second attachment position being forward of the first attachment position relative to the working gas flow direction through the engine. The support structure has three elongate members joined to form a triangular frame encircling the engine casing. A first vertex of the triangular frame attaches to the pylon via a first attachment arrangement at the first attachment position. Two thrust struts respectively extend from the other two vertices of the triangular frame and attach to the pylon via a second attachment arrangement at the second attachment position. Three engine connection formations extend from the respective vertices of the triangular frame to positions on the engine casing to connect the support structure to the engine casing.

11 Claims, 5 Drawing Sheets

SUPPORT STRUCTURE

The present invention relates to a support structure for attaching a gas turbine engine to a pylon.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, a low pressure compressor 14 (LPC), a high-pressure compressor 15 (HPC), combustion equipment 16, a high-pressure turbine 17 (HPT), low pressure turbine 18 (LPT), a free power turbine 19 (FPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26. In alternative arrangements, the propellers may also be driven by the FPT via a gearbox.

The gas turbine engine 10 works in a conventional manner so that air entering the intake 12 is accelerated and compressed by the LPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and low pressure compressors 15, 14 and the propellers 23, 24 by suitable interconnecting shafts. The propellers 23, 24 normally provide the majority of the propulsive thrust.

The gas turbine engine 10 can be used to power an aircraft, and can be attached to the aircraft by a pylon. For example, the pylon may connect between the gas turbine engine and a fuselage of an aircraft.

US 2008/0105782 discloses a mounting system for mounting a gas turbine engine to a fuselage via a pylon. This mounting system uses an elongate brace to attach the mounting system to the pylon at three positions. A front and rear mounting assembly each attaches to a casing surrounding the engine core at three positions, using three respective mounting members. A warren truss arrangement of struts connects the elongate brace to the mounting assemblies, and the mounting system is attached to the engine casing at circumferential positions of a segment of the engine casing adjacent to the pylon.

U.S. Pat. No. 4,854,525 discloses another mounting system in which a large cantilever beam structure extends rearwards from the pylon to an aft mount.

An aim of the present invention is to provide an improved support structure for attaching a gas turbine engine to a pylon.

In a first aspect, the present invention provides a support structure for attaching a gas turbine engine to a pylon, wherein the gas turbine engine has an engine casing surrounding an engine core, and the pylon has first and second attachment positions, the second attachment position being forward of the first attachment position relative to the working gas flow direction through the engine, the support structure comprising:

three elongate members joined to form a triangular frame encircling the engine casing, a first vertex of the triangular frame attaching to the pylon via a first attachment arrangement at the first attachment position;

two thrust struts respectively extending from the other two vertices of the triangular frame and attaching to the pylon via a second attachment arrangement at the second attachment position; and three engine connection formations extending from the respective vertices of the triangular frame to positions on the engine casing for connecting the support structure to the engine casing.

The frame encircling the engine casing facilitates reduction of the radial projection of the support structure from the engine casing, as compared to a support structure of the prior art. Advantageously, a lower engine nacelle aerodynamic profile can then be achieved, such that disruption to the air flow around the engine can be reduced.

In a further advantage, the triangular shape of the frame helps to prevent bending of the elongate members as load is transmitted from the engine casing to the pylon. Therefore, load transmission is not so dependent on the bending stiffness of the elongate members.

Attachment of the thrust struts to the pylon at the second attachment position allows a component of the direction of extension of the thrust struts to be in the axial direction of the engine casing. This axial component of the thrust struts promotes transmission of axial loads from the engine casing, through the engine connection formations, to the triangular frame, and then from the triangular frame to the pylon via the thrust struts. Axial loads can also be transmitted from the first vertex of the triangular frame to the pylon via the first attachment arrangement.

The support structure may have any one or, to the extent that they are compatible, any combination of the following optional features.

The gas turbine engine attached to the pylon by the support structure can be an open rotor engine. For example, the gas turbine engine can be an open rotor pusher engine.

Preferably, the three elongate members form an equilateral triangular frame. This can help to ensure (with appropriate mount stiffness tuning) that substantially equal axial loads are transmitted through the three vertices of the frame.

Typically, each engine connection formation may have at least a pair of connection members. The connection members of each formation can then extend from their vertex of the triangular frame to respective spaced locations on the engine casing. The spaced locations are preferably circumferentially spaced around the engine casing. Such an arrangement assists transmission of loads from the casing to the triangular frame in a manner which helps to resist twisting deformation of the support structure. The engine connection members can be configured to flex to accommodate radial growth of the engine casing.

The spaced locations on the engine casing are typically rearward of the part of the engine casing which is encircled by the triangular frame. This positioning facilitates transmission of axial loads to the frame and thence to the pylon.

Conveniently, the stiffness of each thrust strut can be substantially greater than that of the first attachment arrangement to promote transmission of axial loads through the thrust struts such that, in use, substantially equal axial loads are transmitted through the three vertices of the triangular frame. Thus, the cross-sectional area of the thrust struts may be greater than the cross-sectional areas of the connection members leading to the first attachment arrangement.

Preferably, the second attachment arrangement comprises a balance beam. The two thrust struts can then extend from their respective vertices of the triangular frame to the balance beam, and the balance beam can pivot relative to the second attachment position such that, in use, substantially equal axial loads are transmitted through the thrust struts. The struts can be connected to the balance beam at respective articulatable (e.g. spherical) joints. Transmission of substantially equal axial loads through the thrust struts reduces the transmission of torque loads through the thrust struts, which in turn reduces distortion of the frame and of the engine casing where the engine connection formations attach to the casing. This reduced distortion can improve turbo machinery tip clearances.

The support structure may further comprise a forward mount which extends between an attachment position and a position on the engine casing. The forward mount can be configured to transmit roll torque and side and vertical loads perpendicular to the working gas flow direction from the engine casing to the pylon. These side and vertical loads then work in conjunction with the triangular frame to transfer pitch and yaw couples from the engine into the pylon.

According to one option, the second attachment arrangement comprises the forward mount. In the case where the second attachment arrangement also comprises a balance beam, the beam can be carried by the mount. Typically, the second attachment position is then relatively far forward and the thrust struts may extend over the compressor casing. However, as a result, the thrust struts can be more closely aligned to the engine axis, improving their ability to transmit axial thrust loads. In contrast, according to a second option, the pylon can have a third attachment position which is forward of the second attachment position, and the forward mount may extend between the third attachment position and the position on the engine casing. Typically, the second attachment position is then relatively less far forward.

Typically, the gas turbine engine has in flow series a compressor section, a combustor, and a turbine section. The triangular frame of the support structure preferably encircles the combustor. In the event of a disc burst event in the turbine section, the frame, which is a key component of the support structure, can then be positioned away from the turbine disc burst envelope. The risk of a failure of any of the elongate members in the triangular frame, and consequently the risk of engine loss, can thus be reduced. On the other hand, the three engine connection formations, which typically cross the disc burst envelope, can be configured to provide structural redundancy, such that damage to one, some or all of the formations may not lead to engine loss. For example, preferably the engine can be adequately supported by just two of the engine connection formations. For example, each engine connection formation may have three connection members. A combustor failure resulting in breakout of a "torching flame" may be kept from the triangular frame by a deflection plate with fire detection wires, allowing the torching flame to be detected before the loss of the primary support structure elements (such as the elongate members).

Preferably, the engine connection formations can be attached to the engine casing at articulatable joints to accommodate radial growth of the engine casing. For example, the engine connection formations can connect to the engine casing at spherical joints.

Conveniently, the first vertex of the triangular frame may be attached at the first attachment position at an articulatable joint. For example, the triangular frame may be attached to the pylon at a spherical joint.

Preferably, some or all of the attachments between the support structure and the pylon, and between the support structure and the engine can include vibration isolators. Thus respective vibration isolators can be located at the first and second (and the optional third) attachment positions. Additionally or alternatively, respective vibration isolators can be located at the attachments of the engine connection formations to the engine casing. The isolators can provide low stiffness connections which help to reduce the transmission of vibrations from the pylon and/or engine casing through the support structure. Indeed, vibration isolators can be provided at any point within the support structure, e.g. at the vertices of the triangular frame.

In a second aspect, the present invention provides a gas turbine engine having the support structure of the first aspect.

In a third aspect, the present invention provides an aircraft having a pylon and a gas turbine engine of the second aspect which is attached to the pylon by the support structure.

Embodiments of the invention will now be described by way of example with reference to the accompanying drawings in which.

Figure 1:
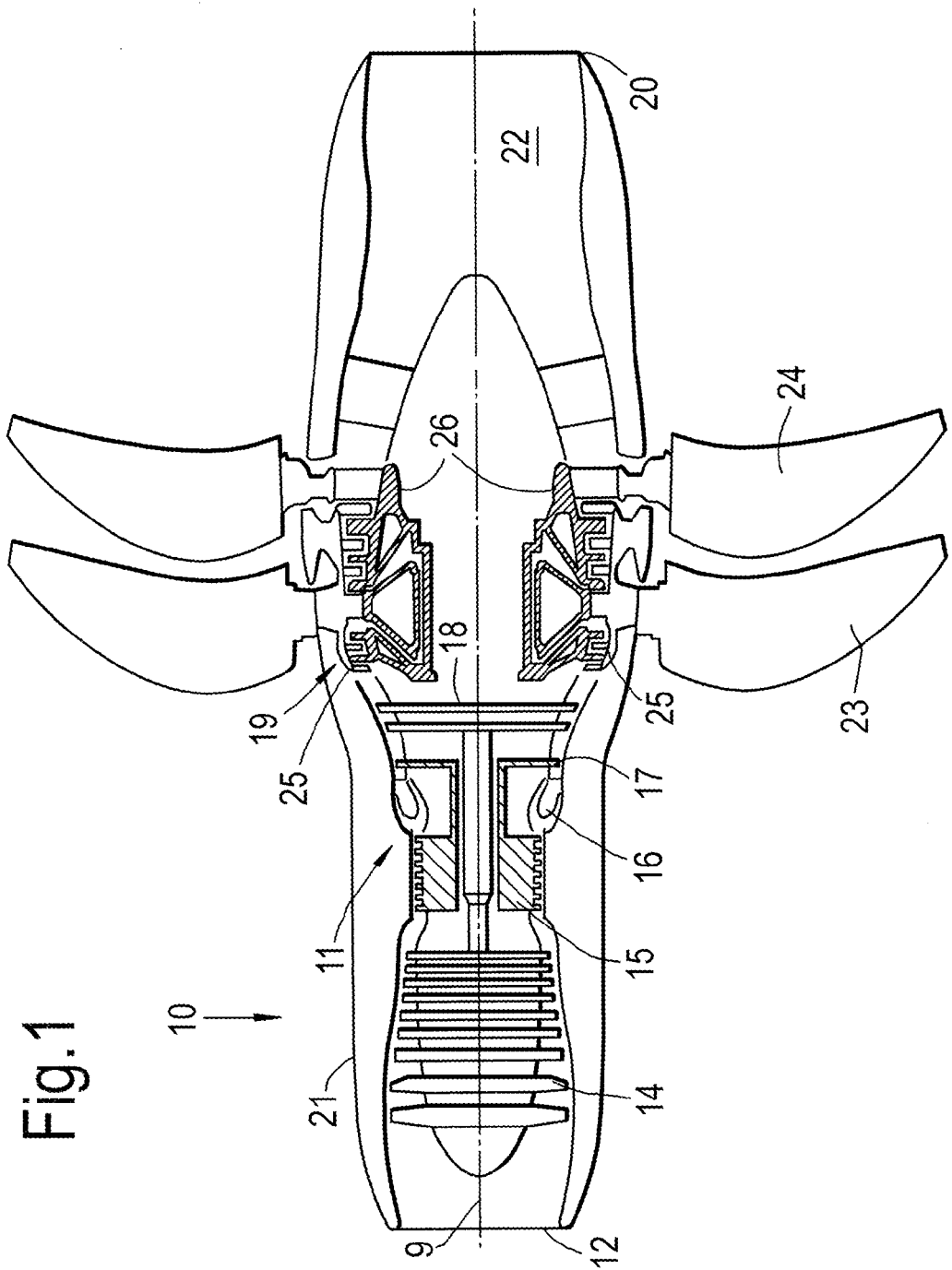
FIG. 1 shows schematically a longitudinal section through a twin-spooled, contra-rotating propeller gas turbine engine.
Figure 2:
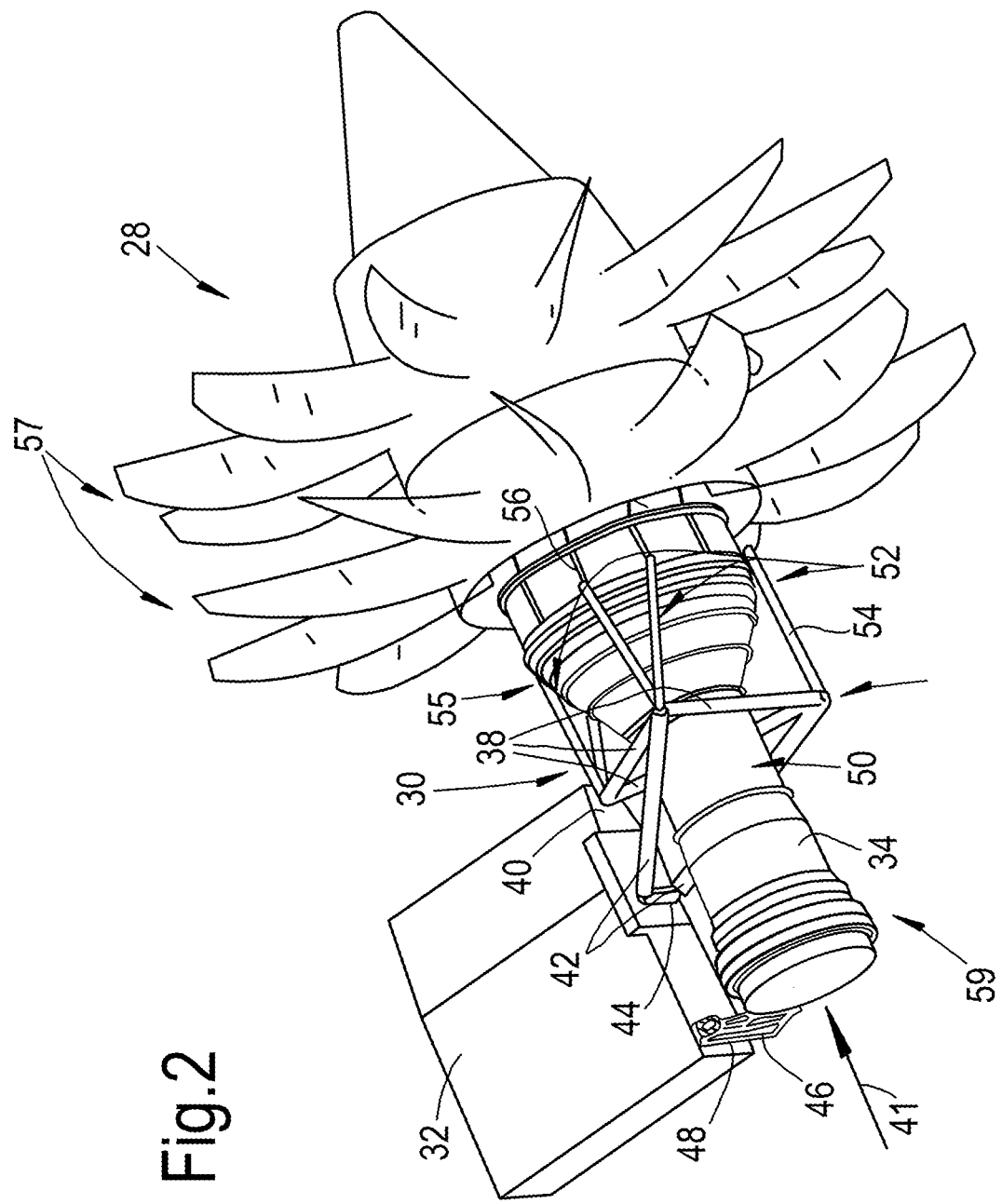
FIG. 2 shows schematically a perspective view of a support structure of the present invention attaching an open rotor pusher engine to a pylon.
Figure 3:
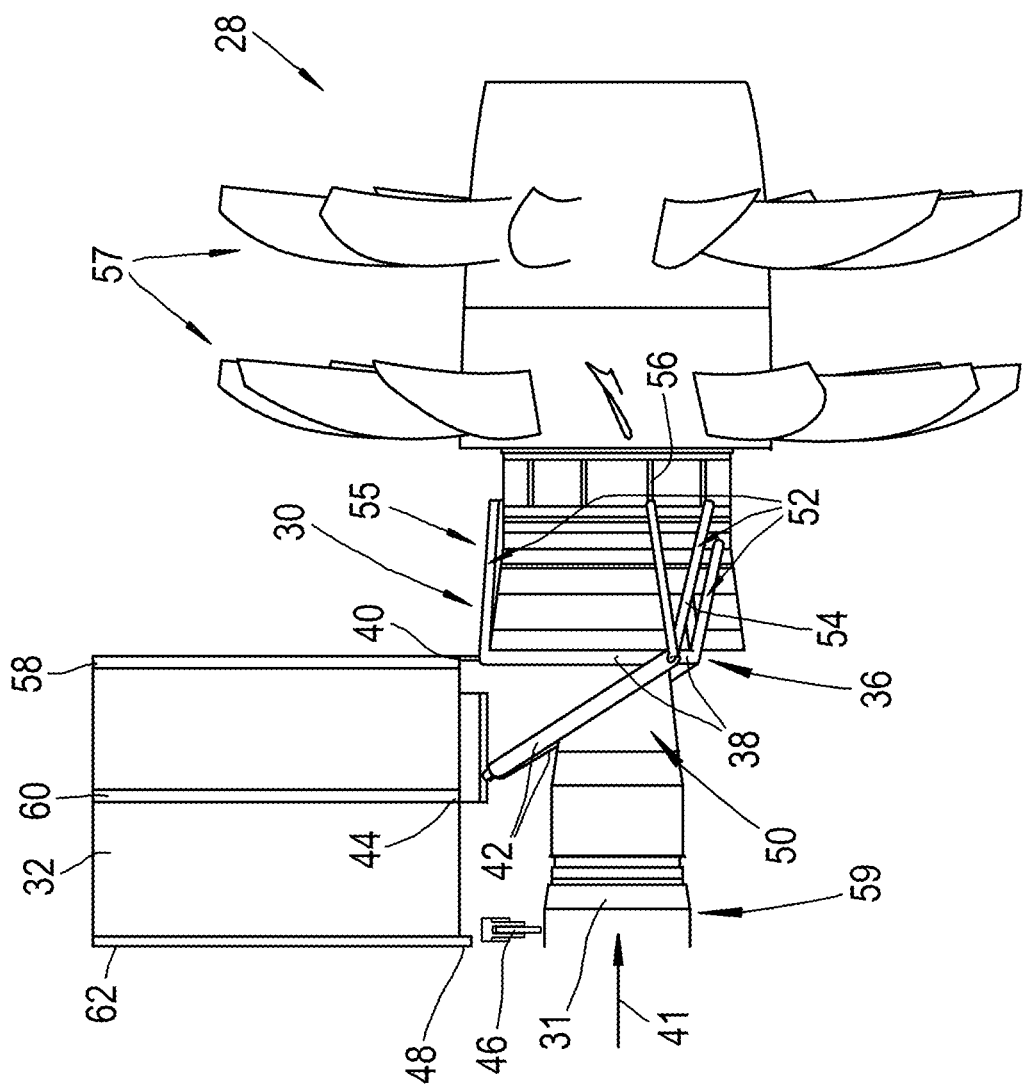
FIG. 3 shows schematically a top elevation of the support structure, the open rotor pusher engine and the pylon of FIG. 2.

FIGS. 2 and 3 schematically show a support structure 30 attaching an open rotor pusher engine 28 to a pylon 32. The open rotor pusher engine has an engine casing 34 which surrounds the engine core, and open rotors 57 towards the rear of the engine relative to the direction of working gas flow 41 through the engine. A series of stators 56 extend across the engine exhaust, forward of the open rotors and rearward of a turbine section (the position of which is indicated generally at 55). The stators are arranged circumferentially around the engine core and centre the engine casing about an inboard structure (not shown) that extends rearwardly and carries, for example, the open rotors and optionally a gear box for the open rotors.

The pylon has three attachment positions; a first attachment position 40, a second attachment position 44 forward of the first attachment position relative to the working gas flow 41, and a third attachment position 48 forward of the second attachment position. Referring to FIG. 3, these attachment positions coincide respectively with a rear spar 58, mid spar 60 and front spar 62 of the pylon.

The support structure 30 has three elongate members 38 forming a triangular frame 36, which encircles the engine casing 34. In this embodiment, the triangular frame is an equilateral triangle, but in an alternative embodiment the triangular frame could be any triangular form. The triangular frame is positioned such that it also encircles the combustor of the open rotor pusher engine, the position of which is indicated generally at 50. In this embodiment the triangular frame is positioned to encircle the downstream end of the combustor, but in alternative embodiments the triangular frame can be positioned further forward, but preferably still encircling the combustor. The triangular frame is attached to the first attachment position 40 on the pylon 32 at a vertex of the triangular frame. Two thrust struts 42 extend forward, relative to the working gas flow 41, from the other two vertices of the triangular frame, and attach to the pylon at the second attachment position 44 via a balance beam as discussed in more detail below and illustrated in FIG. 6. The support structure also has a front mount 46 which extends between the third attachment position 48 on the pylon, to a forward position on the engine casing 34 where it is forward of a compressor section of the engine (the position of which is indicated generally at 59). However, in an alternative embodiment, the thrust struts 42 can extend to the front spar 62 of the pylon. That is, the third attachment position can be combined with the second attachment position. In this alternative embodiment, the attachment means for attaching the thrust struts to the pylon can be carried by the front mount, the attachment means typically being a balance beam arrangement, as discussed later with reference to FIG. 6.

Three engine connection formations 52 extend rearwardly from respective vertices of the triangular frame 36 to the engine casing 34. Each engine connection formation has at least a pair of connection members 54 (only one connection member is labelled in FIGS. 2 and 3 for clarity). The connection members of each pair extend from a respective vertex of the triangular frame to respective circumferentially spaced locations on the engine casing. In this embodiment, the spaced locations coincide with the position of some of the stators 56 that extend across the engine exhaust. Since the engine connection formations extend from each vertex of the equilateral triangular frame, they are spaced at 120° to each other.

Forming the elongate members 38 into a frame 36 that encircles the engine casing 34 at the narrow combustor waist of the engine is advantageous because it can allow a smaller diameter nacelle to be fitted to the engine, with aerodynamic drag and weight benefits. Further, the triangular shape of the frame provides a rigid path for load transmission by helping to prevent any flexing of the elongate members. The triangular frame is a key structural element of the support structure, and positioning it around the combustor ensures that it is outside the rotor burst envelopes of the compressor and turbine sections of the engine. Thus, in the unlikely event of a rotor disc burst, the risk of the triangular frame being impacted by burst fragments is reduced, which in turn reduces the risk of the engine detaching from the pylon. On the other hand, the engine connection formations 52 provide structural redundancy, such that, for example, one of them can be removed and the other two can still support the engine on the triangular frame and the engine casing. This structural redundancy allows the engine connection formations to be extended across the turbine section burst envelope.

Figure 4:
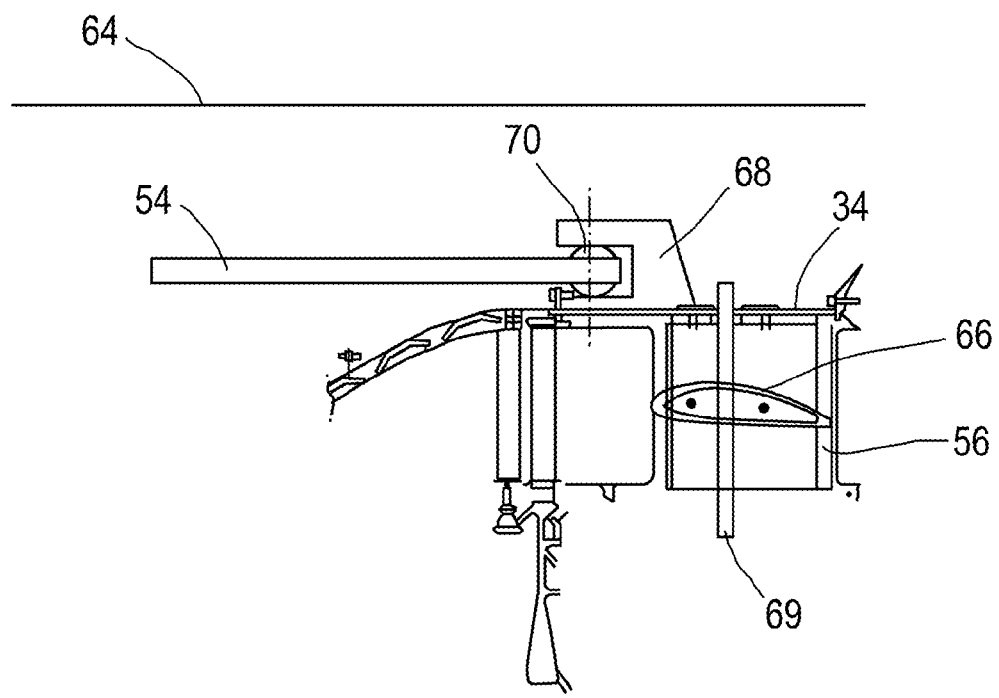
FIG. 4 shows schematically a cross-section illustrating the attachment of an engine connection member of the support structure of FIGS. 2 and 3 to the engine casing of FIGS. 2 and 3.

Referring to the cross-section of FIG. 4, the connection of a connection member 54 to the engine casing 34 is shown in more detail. The connection member is connected to the engine casing at a lug 68 projecting from the engine casing at a location coinciding with the forward edge of the respective stator 56 (the aerofoil section of which is indicated 66). This allows engine systems 69 to be routed through the hollow stator. The lug projects only a short distance from the casing, so as to have a low radial profile with respect to the casing. Advantageously, the low radial profile of the connection lugs does not significantly reduce the distance between the engine casing 34 and the nacelle surface 64, i.e. the nacelle cowl loft line does not have to be increased in diameter. A spherical joint 70 connects the connection member to the connection lug. This spherical joint articulates the connection member such that radial growth of the engine casing can be accommodated. Additionally, or alternatively, radial growth of the engine casing may be accommodated by flexing of the connection members.

Figure 5:
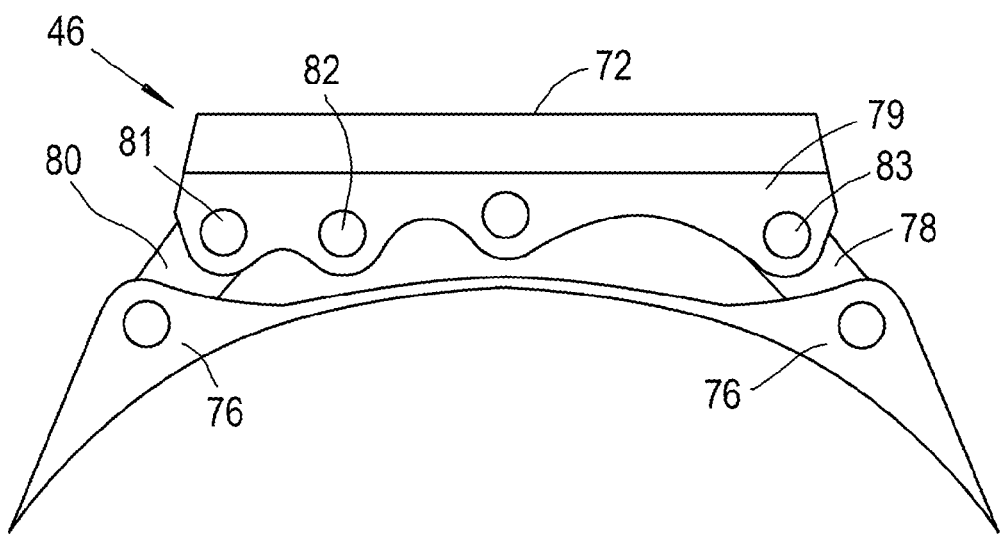
FIG. 5 shows schematically a front mount of the support structure of FIGS. 2 and 3.

Referring to FIG. 5, the front mount of the support structure of FIGS. 2 and 3 is indicated generally at 46. Side 72 of the mount attaches to the pylon 32 so that a body portion 79 of the mount projects from the pylon towards the engine casing 34. Engine casing lugs 76 project from the outer surface of the engine casing. The body portion joins to the engine casing lugs by two side fixtures or links 80 and 78. One of these side fixtures 80 fixes to the body portion at two pin positions 81, 82, and the other side fixture 78, fixes to the body portion at one pin position 83. Each side fixture respectively attaches to a respective engine casing lug at one pin position. The mount transmits roll torque between the engine casing and the pylon and stabilises the gas turbine engine 28 against loads acting on the gas turbine engine in a direction perpendicular to the working gas flow 41, while allowing axial, yaw and pitch freedom.

Figure 6:
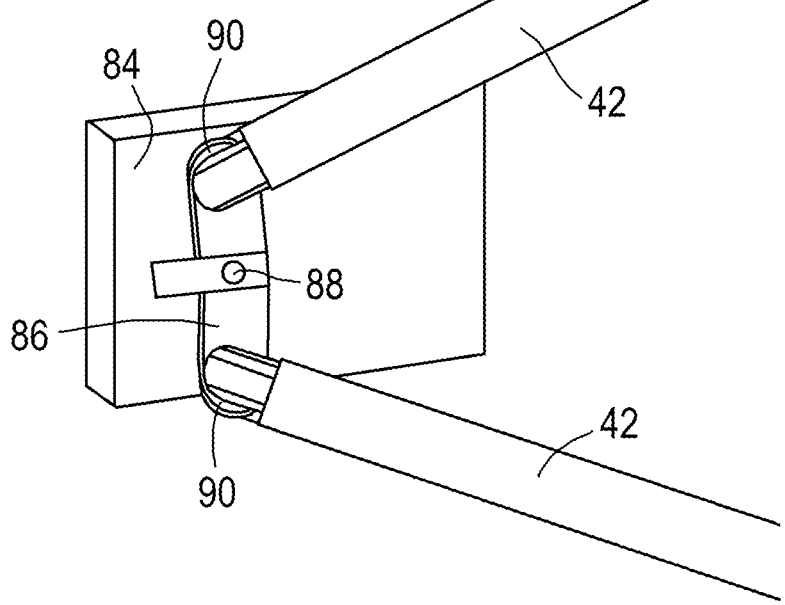
FIG. 6 shows schematically the attachment between thrust struts and the pylon of FIGS. 2 and 3.

FIG. 6 shows schematically the attachment arrangement between the thrust struts 42 and the pylon 32 of FIGS. 2 and 3. The thrust struts 42 extend from two vertices of the triangular frame to the second attachment position 44 on the pylon. At the second attachment position an attachment block 84 extends from the pylon. A balance beam 86 is attached to the attachment block at a pivot point 88. Each thrust strut is attached to a respective end of the balance beam at a spherical joint 90. Mechanical stops (not shown) extending from the mounting block 84 limit the permissible angular rotation of the balance beam. This can help to ensure structural stability in the event of partial failure of the support structure.

An alternative configuration combines the front mount 46 and the attachment arrangement for the thrust struts 42 into one attachment arrangement, e.g. at the end of the front spar 62 of the pylon. The balance beam 86 can then be carried by the front mount 46 such that the thrust struts extend further forwards and are therefore more closely aligned to the engine axis, improving their capability to transmit axial thrust loads.

Figure 7:
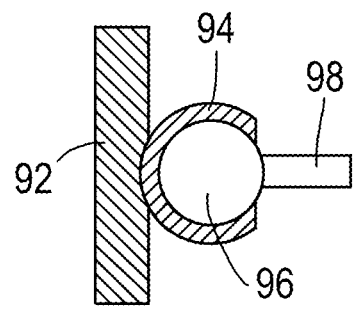
FIG. 7 shows the attachment between the first vertex of a triangular frame and the pylon of FIGS. 2 and 3.

The triangular frame 36 is attached to the first attachment position 40 on the pylon 32 using the attachment arrangement shown in FIG. 7. A further attachment block 92 extends from the pylon and a socket 94 projects from the block. A joining member 98 connects to the third vertex of the triangular frame, and ends in a ball 96 that fits within the socket forming a spherical joint between the pylon and the triangular frame.

Optionally, some or all of the spherical joints discussed above can include vibration isolators with an elastomeric and/or metal mesh to provide a low stiffness connection between the support structure and the pylon or the support structure and the engine. This type of connection can help to reduce the transmission of vibrations from the pylon and/or engine casing through the support structure. Additionally or alternatively, vibration isolators can be fitted at any point within the support structure.

In use, axial thrust loads are transmitted from the engine casing 34 to each vertex of the triangular frame 36 via the engine connection members 54. As discussed above, pairs of connection members extend from respective circumferentially spaced positions on the engine casing to a vertex of the triangular frame. This arrangement helps to reduce twisting distortion of the support structure 30. Ideally the axial loads transmitted at the vertices of the triangular frame are all equal. This ideal can be promoted by a combination of (i) forming the triangular frame as an equilateral triangle, and (ii) encouraging transmission of axial loads through the thrust struts 42 e.g. by configuring the struts so that a significant component of the direction of extension of the struts is in the axial direction of the gas turbine engine, and by ensuring the struts have a stiffness that is matched to that of the attachment arrangement shown in FIG. 7. In this particular embodiment, greater stiffness of the struts is achieved by providing the struts with a larger cross-sectional area than the connection members 54 to the first attachment 40.

The balance beam 86 joining the thrust struts 42 to the pylon 32 helps to ensure that the axial loads transmitted by the two thrust struts are substantially equal. Equal axial load transmission by the thrust struts reduces the transmission of torque loads across the triangular frame 36, as well as promoting a desirable aim of equal axial load transmission at each vertex of the triangular frame.

The triangular frame 36 is isolated in pitch but not in yaw. More particularly, in pitch the triangular frame can pivot about the third (inboard) vertex of the triangular frame of the triangular frame at the pylon 32, and the differential axial movement of the first and second (outboard) vertices is accommodated by swinging of the balance beam 86. In yaw both the outboard vertices of the triangular frame pull on the thrust struts 42 and the balance beam equally, hence there is no movement or rotation of the balance beam and a yaw couple is transmitted.

The support structure provides further advantages other than those already mentioned above:

- The support structure can avoid the need for a large cantilever beam as proposed in U.S. Pat. No. 4,854,525. Such a beam, which extends rearwards from the pylon to an aft mount, would influence the nacelle.
- The support structure allows the pylon rear spar 58 to be moved forwards, allowing the pylon fairing trailing edge to be closed out earlier ahead of the open rotors 57.
- In the unlikely event that all the engine connection members 54 fail, the engine can drop into and continue to be supported by the triangular frame 36.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An aircraft having a pylon, a gas turbine engine and a support structure for attaching the gas turbine engine to the pylon, wherein the gas turbine engine has an engine casing surrounding an engine core, and the pylon has first and second attachment positions, the second attachment position being forward of the first attachment position relative to the working gas flow direction through the engine, the support structure comprising:

three elongate members joined to form a triangular frame encircling the engine casing, a first vertex of the triangular frame attaching to the pylon via a first attachment arrangement at the first attachment position;

two thrust struts respectively extending from the other two vertices of the triangular frame and attaching to the pylon via a second attachment arrangement at the second attachment position; and three engine connection formations extending from the respective vertices of the triangular frame to positions on the engine casing for connecting the support structure to the engine casing.

2. An aircraft according to claim 1, wherein each engine connection formation has at least a pair of connection members, the connection members of each formation extending from their vertex of the triangular frame to respective circumferentially spaced locations on the engine casing.

3. An aircraft according to claim 1, wherein the stiffness of each thrust strut is substantially greater than that of the first attachment arrangement to promote transmission of axial loads through the thrust struts such that, in use, substantially equal axial loads are transmitted through the three vertices of the triangular frame.

4. An aircraft according to claim 1, wherein the second attachment arrangement comprises a balance beam, the two thrust struts extending from their respective vertices of the triangular frame to the balance beam, and the balance beam being pivotably attached to the second attachment position such that, in use, substantially equal axial loads are transmitted through the thrust struts.

5. An aircraft according to claim 1, wherein the second attachment arrangement comprises a front mount which extends between the second attachment position and a position on the engine casing.

6. An aircraft according to claim 1, wherein the second attachment arrangement comprises a balance beam, the two thrust struts extending from their respective vertices of the triangular frame to the balance beam, and the balance beam being pivotably attached to the second attachment position such that, in use, substantially equal axial loads are transmitted through the thrust struts, wherein the second attachment arrangement comprises a front mount which extends between the second attachment position and a position on the engine casing, wherein the balance beam is carried by the front mount.

7. An aircraft according to claim 1, wherein the pylon has a third attachment position which is forward of the second attachment position, and the support structure further comprises a front mount extending between the third attachment position and a position on the engine casing.

8. An aircraft according to claim 1, wherein the gas turbine engine has in flow series a compressor section, a combustor, and a turbine section, and the triangular frame of the support structure encircles the combustor.

9. An aircraft according to claim 1, wherein the engine connection formations are attached to the engine casing at articulatable joints to accommodate radial growth of the engine casing.

10. An aircraft according to claim 1, wherein the first vertex of the triangular frame is attached at the first attachment position at an articulatable joint.

11. An aircraft according to claim 1 wherein the engine is an open rotor engine.

* * * * *